United States Patent
Andersen et al.

(10) Patent No.: US 7,354,004 B2
(45) Date of Patent: Apr. 8, 2008

(54) PRESENTATION INSTRUMENT DISPLAY AND ACTIVATION SYSTEMS AND METHODS

(75) Inventors: Tonya Andersen, Denver, CO (US); Karen Kaukol, Highlands Ranch, CO (US); Deborah Rex, Parker, CO (US); Gary Jeffords, Centennial, CO (US)

(73) Assignees: The Western Union Company, Englewood, CO (US); First Data Corporation, Greenwood Village, CO (US)

( * ) Notice: Subject to any disclaimer, the term of this patent is extended or adjusted under 35 U.S.C. 154(b) by 0 days.

(21) Appl. No.: 11/265,530

(22) Filed: Nov. 1, 2005

(65) Prior Publication Data
US 2007/0045404 A1 Mar. 1, 2007

Related U.S. Application Data

(60) Provisional application No. 60/711,017, filed on Aug. 23, 2005.

(51) Int. Cl.
*G06K 19/00* (2006.01)

(52) U.S. Cl. .................. 235/487; 235/375; 235/380

(58) Field of Classification Search .............. 235/375, 235/380, 382, 487
See application file for complete search history.

(56) References Cited

U.S. PATENT DOCUMENTS 6,224,108 B1    5/2001  Klure

| | | |
|---|---|---|
| 2003/0028439 A1* | 2/2003 | Cox et al. ................. 705/26 |
| 2005/0017502 A1 | 1/2005 | Chariker |
| 2005/0080728 A1* | 4/2005 | Sobek .................... 705/39 |
| 2005/0203857 A1* | 9/2005 | Friedman .................. 705/78 |
| 2005/0205663 A1 | 9/2005 | Algiene |
| 2005/0211763 A1* | 9/2005 | Sgambati et al. ........... 235/379 |
| 2007/0034688 A1* | 2/2007 | Burke .................... 235/380 |
| 2007/0063021 A1 | 3/2007 | Chakiris et al. |
| 2007/0063052 A1 | 3/2007 | Chakiris et al. |

* cited by examiner

*Primary Examiner*—Karl D. Frech
(74) *Attorney, Agent, or Firm*—Townsend and Townsend and Crew LLP

(57) ABSTRACT

A method of validating and activating a purchase card includes providing a purchase card that is removably attached to a card carrier, wherein the purchase card has an account identifier associated therewith and has a card indicium affixed thereto, wherein the purchase card includes a machine-readable information encoding region into which the account identifier is encoded, and wherein the card carrier has a carrier indicium affixed thereto; populating a database with a stored card indicium that relates to the card indicium, a stored carrier indicium that relates to the carrier indicium, and a stored account identifier that relates to the account identifier, thereby uniquely coupling the account identifier to the card indicium; at a point-of-sale device and in response to a customer request to purchase the purchase card, entering information from the card indicium into the point-of-sale device; at the point-of-sale device, entering information from the carrier indicium into the point-of-sale device; comparing the information from the card indicium and the information from the carrier indicium with the stored card indicium and the stored carrier indicium; and based at least in part on the comparing step, activating the card by associating value to it.

20 Claims, 11 Drawing Sheets

PRESENTATION INSTRUMENT DISPLAY AND ACTIVATION SYSTEMS AND METHODS

CROSS-REFERENCES TO RELATED APPLICATIONS

This applications is a non-provisional of and claims the benefit of, co-pending, commonly assigned U.S. Provisional Patent Application No. 60/711,017, entitled "PRESENTATION INSTRUMENT DISPLAY, AND ACTIVATION SYSTEMS AND METHODS," filed on Aug. 23, 2005 by Tonya Andersen, et al., which application is incorporated herein in its entirety for all purposes.

This application is related to the following co-pending, commonly assigned U.S. Patent Applications, the entirety of each of which is herein incorporated by reference for all purposes: U.S. patent application Ser. No. 10/803,814, entitled "CARD DISPLAY SYSTEM AND METHOD," filed on Mar. 17, 2004; U.S. patent application Ser. No. 11/059,298, entitled "TRANSACTION CARD ASSEMBLIES AND METHODS," filed on Feb. 15, 2005; U.S. patent application Ser. No. 11/117,606, entitled "TAMPER RESISTANT PRESENTATION INSTRUMENTS AND METHODS," filed on Apr. 27, 2005; U.S. patent application Ser. No. 11/122,414, entitled "SYSTEM AND METHOD FOR ACCOUNTING FOR ACTIVATION OF STORED VALUE CARDS," filed on May 4, 2005; U.S. Patent Application No. 60/680,408, entitled "TRANSACTION CARD CARRIER ASSEMBLIES," filed on May 11, 2005; U.S. patent application Ser. No. 11/128,115, entitled "SYSTEM AND METHOD FOR DETECTING FRAUDULENT USE OF STORED VALUE INSTRUMENTS," filed on May 11, 2005; U.S. Patent Application No. 60/680,379, entitled "SECURITY SYSTEMS FOR A PAYMENT INSTRUMENT," filed on May 11, 2005; U.S. Patent Application No. 60/680,383, entitled "ANTI-FRAUD PRESENTATION INSTRUMENTS, SYSTEMS AND METHODS," filed on May 11, 2005; U.S. patent application Ser. No. 11/132,710, entitled "MONEY TRANSFER CARDS, SYSTEMS AND METHODS," filed on May 18, 2005; and U.S. patent application Ser. No. 11/155,323, entitled "TRANSACTION CARD CARRIER ASSEMBLIES," filed on Jun. 17, 2005.

Embodiments of the invention relate generally to presentation instruments. More specifically, embodiments of the invention provide, among other things, prepaid presentation instrument validation and activation systems and methods.

BACKGROUND OF THE INVENTION

Stored-value and other varieties of pre-paid presentation instruments (e.g., gift cards, debit cards, prepaid credit cards, phone cards, etc.) are becoming increasingly popular, especially as a means to transfer money from one individual to another. They provide near the convenience of cash, given their wide acceptance, yet avoid the need to actually carry cash. Further, they may be "loaded" with value from any of a number of sources. Hence, the purchaser need not have cash to acquire such cards. Further still, stored-value presentation instruments allow those with poor credit and/or those who wish to remain anonymous to enjoy the purchasing convenience of credit cards.

Inactive stored-value presentation instruments, especially gift cards, are displayed for purchase like a typical retail item, often being displayed near the registers of retail establishments to provide convenient access for purchasers and to increase impulse purchases. Stored-value presentation instruments typically are not loaded with value while displayed. Nevertheless, some have devised ways to defeat presently-known security measures. For these and other reasons, improved validation and activation systems and methods are needed for presentation instruments, especially stored-value presentation instruments.

BRIEF SUMMARY OF THE INVENTION

Embodiments of the invention provide a method of validating and activating a purchase card. The method includes providing a purchase card that is removably attached to a card carrier. The purchase card has an account identifier associated therewith and has a card indicium affixed thereto. The purchase card includes a machine-readable information encoding region into which the account identifier is encoded. The card carrier has a carrier indicium affixed thereto. The method further includes populating a database with a stored card indicium that relates to the card indicium, a stored carrier indicium that relates to the carrier indicium, and a stored account identifier that relates to the account identifier. This uniquely couples the account identifier to the card indicium. The method also includes, at a point-of-sale device and in response to a customer request to purchase the purchase card, entering information from the card indicium into the point-of-sale device. The method further includes, at the point-of-sale device, entering information from the carrier indicium into the point-of-sale device, comparing the information from the card indicium and the information from the carrier indicium with the stored card indicium and the stored carrier indicium, and, based at least in part on the comparing step, activating the card by associating value to it.

In some embodiments, the method includes entering the account identifier into the point-of-sale device, in which case the comparing step includes comparing the account identifier from the card to the stored account identifier. Entering the account identifier into the point-of-sale device may include reading the account identifier from the machine-readable information encoding region. The account identifier may be embossed on the card, in which case entering the account identifier into the point-of-sale device may include an attendant keying the account identifier into the point-of-sale device. The method also may include settling a transaction using the card, in which case settling a transaction using the card includes entering the account identifier from the card into a point-of-sale device, entering information from the card indicium into the point-of-sale device, transmitting the account identifier, the information from the card indicium, and a transaction settlement amount to the host computer system, at the host computer system, comparing the account identifier to the stored account identifier, the information from the card indicium information to the stored card indicium, and the transaction settlement amount to an amount of value associated with the card, and, based at least in part on the comparing step, debiting the transaction settlement amount from the amount of value associated with the card.

In some embodiments, settling a transaction may include receiving cash at an automated teller machine, settling a purchase transaction as a debit card transaction, settling a purchase transaction as a credit card transaction, and/or settling a purchase transaction as a gift card transaction. The card indicium may include a bar code and/or a radio frequency identification tag. The purchase card may be a gift card, a pre-paid debit card, a stored value card, and/or a credit card. The point-of-sale device may be a checkout scanner. The machine-readable information encoding region may be a magnetic stripe and/or a radio frequency identification tag. Comparing the information from the card indicium and the information from the carrier indicium with the stored card indicium and the stored carrier indicium may include sending the card indicium read from the card and the carrier indicium read from the carrier to a processor associated with the database, extracting the stored card indicium and the stored carrier indicium from the database, and comparing the card indicium read from the card and the carrier indicium read from the carrier to the stored card indicium and the stored carrier indicium. The database may include a local database. The database may include a database associated with a host computer system.

In some embodiments, the carrier may have a password associated therewith, in which case activating the card by associating value to it may include, at an activation location, receiving an activation request. The activation request may include the password and the account identifier. Activating the card may further include comparing the password to a stored password associated with the account identifier in the database, receiving an amount of value to load onto the card, and activating the purchase card if the comparing step results in a match. The activation location may be a web site, an interactive voice response unit, and/or a call center.

In still other embodiments, a method of validating and activating a purchase card includes, at a host computer system, receiving a validation request from a point-of-sale device to validate the card. The validation request includes a card indicium and a carrier indicium. The method also includes, at the host computer system, using one of the card indicium and the carrier indicium to locate a related stored card indicium or stored carrier indicium in a database of stored card indicia, stored carrier indicia, and account identifiers, comparing the card indicium to the stored card indicium and the carrier indicium to the stored carrier indicium, based on the comparison, sending a validation message to the point-of-sale device, receiving an amount of value to associate with the card, and storing the amount of value at the host computer system.

In some embodiments, the validation request also includes an account identifier associated with the car, in which case the step of comparing the card indicium to the stored card indicium and the carrier indicium to the stored carrier indicium includes comparing the account identifier associated with the card to a stored account identifier. The validation message may include a stored account identifier associated with one of the card indicium and carrier indicium, in which case the method may include receiving confirmation from the point-of-sale device that an account identifier associated with the card matches the stored account identifier. The method also may include settling a purchase transaction using the card, in which case settling a transaction using the card may include, at the host computer system, receiving an account identifier from the card from a point-of-sale device, at the host computer system, receiving the card indicium from the point-of-sale device, receiving a transaction settlement amount at the host computer system, at the host computer system, comparing the account identifier to a stored account identifier, the card indicium to the stored card indicium, and the transaction settlement amount to an amount of value associated with the card, and, based at least in part on the comparing step, debiting the transaction settlement amount from the amount of value associated with the card.

In some embodiments, settling a transaction may include receiving cash at an automated teller machine, settling a purchase transaction as a debit card transaction, settling a purchase transaction as a credit card transaction, and/or settling a purchase transaction as a gift card transaction. Settling a transaction may include, at an activation location, receiving an activation request, in which case the activation request may include the account identifier and a password. Receiving an amount of value to associate with the card also may include comparing the password to a stored password associated with the account identifier in the database, receiving an amount of value to load onto the card, and activating the purchase card if the comparing step results in a match. The activation location may include a web site, an interactive voice response unit, and/or a call center.

In still other embodiments, a retail item for purchase includes a purchase card, and a carrier to which the purchase card is removably attached. The purchase card has an account identifier associated therewith. The purchase card has a card indicium affixed thereto. The purchase card includes a machine-readable information encoding region into which an account identifier is encoded. The purchase card is removably attached to the card carrier so that the card indicium is readably accessible. The card carrier has a carrier indicium affixed thereto.

In some embodiments, the card has the account identifier embossed thereon. The card indicium may include a bar code having the card indicium encoded therein and/or a radio frequency identification tag having the card indicium encoded therein. The purchase card may include a gift card, a pre-paid debit card, a stored value card, and/or a credit card. The machine-readable information encoding region may be a magnetic stripe and/or a radio frequency identification tag.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1A:
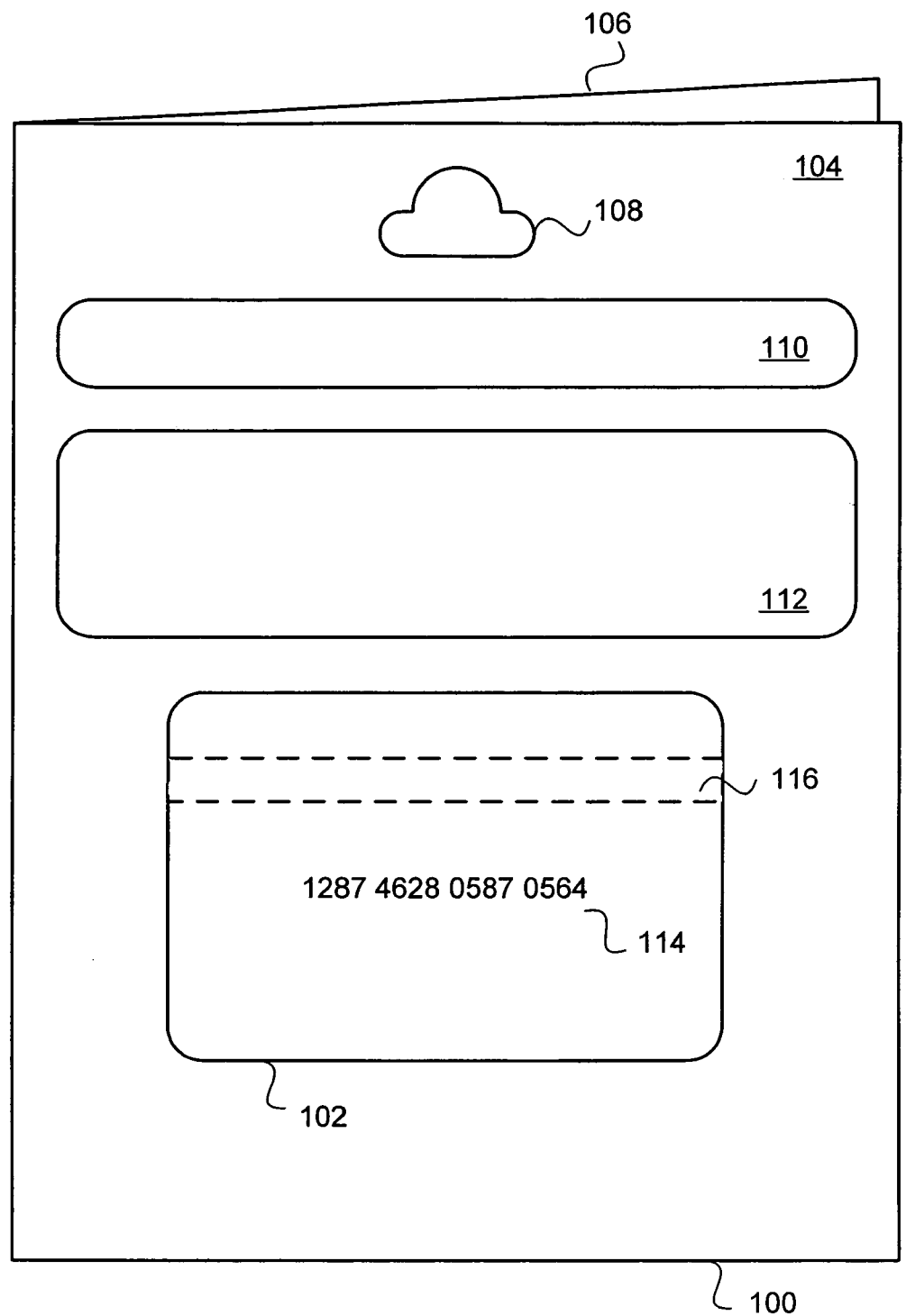
FIGS. 1A to 1C illustrate a first exemplary purchase card and carrier according to embodiments of the invention.

According to embodiments of the present invention, a presentation instrument is attached to a carrier and displayed for purchase at a retail establishment. Presentation instruments according to embodiments of the invention include, without limitation, gift cards, stored-value cards, prepaid debit cards, prepaid credit cards, and the like, hereinafter collectively referred to as "purchase cards," or simply "cards," even though presentation instruments, according to embodiments of the invention are not limited to "cards" and may include emissive "fobs" or other radio frequency identification (RFID) devices, for example. Purchase cards may have a "chip" or other information storage device integral thereto onto which value is loaded. In other embodiments, the card is linked to an account at a host computer system at which location value is stored. Hence, transactions involving the latter variety are settled through interaction with the host computer system. Other examples exist.

According to some embodiments, purchase cards include a magnetic stripe or other machine-readable/writable region that is encoded with an account identifier and/or a representation of the account identifier. In some embodiments, the account identifier is also embossed on the card. The magnetic stripe may be accessible prior to activation so that a clerk can "swipe" the account identifier information from the card at the time it is purchased and validated. In other embodiments, the card is packaged to that the magnetic stripe is inaccessible while the purchase card is displayed for purchase. If the packaging has been tampered with prior to purchase, the card is simply discarded. The purchase card also has a machine-readable indicium, such as a bar code, printed or otherwise affixed to the card.

The purchase card is attached to a carrier for display at a retail establishment. The carrier may include advertising, a product name or logo, terms and conditions, activation instructions, and/or the like. The carrier also has a machine-readable indicium, such as a bar code, printed thereon or affixed thereto. The card indicium and the carrier indicium may be the same or may be uniquely associated with one another to prevent substitution of a "fake" card with the original card.

In some embodiments, the purchase card/carrier has an associated password. The password may be hidden by a scratch-off region on the carrier or otherwise inaccessible prior to purchase.

When a customer presents a purchase card to a checkout attendant, the attendant begins the card validation and/or activation process. It should be noted that the term "validation" will be used herein to refer generally to the process of determining that the card is valid. That is, the process determines whether the card has been altered by, for example, having a different account number encoded onto the magnetic stripe, a different card attached to the carrier, or the like. "Activation," as used herein, generally refers to the process of assigning value to the card. The two functions may take place simultaneously, in some embodiments. In other embodiments, the card is validated at, for example, the retail establishment then later activated by the purchaser as will be described.

The checkout attendant initiates the process by scanning one of the machine-readable indicium, either from the carrier or from the card itself. The checkout scanner may recognize from the indicium that the transaction relates to a purchase card validation transaction. This may be because an inventory system associated with the retail establishment recognizes a number associated with the indicium as being within a range relating to such purchase cards. In some embodiments, the attendant selects a key on the checkout scanner that appropriately enables the scanner for such a transaction. The attendant thereafter scans the second machine readable indicium.

In some embodiments, information from the two indicia are sent via a network to a host computer system where the information is compared to stored information. For the purchase card to be valid, the information from the two indicia must match or otherwise uniquely relate to one another. This may be determined by reference to a database of stored information reflective of the inventory of such cards.

In some embodiments, the account number is also verified. This may be accomplished in a number of different ways. For example, if the information checks out, the host computer system may return an account identifier that is stored with the indicia information, and the attendant compares the returned account identifier to the embossed account number on the card. Only if these numbers match is activation of the purchase card allowed to continue.

In other embodiments, the attendant enters the account number into the checkout scanner for transmission to the host computer system. The attendant may enter the account number by manually keying the number as embossed on the card. In some embodiments, the attendant swipes the card through a reader so that the machine-readable region (e.g., the magnetic strip) is read. The account number may be sent to the host computer system at the same time the two indicia are sent or in a subsequent step. In any of these embodiments, the account number comparison takes place at the host computer system and a validation message is returned if the comparison passes. Otherwise, the process terminates and the card is disabled.

In some embodiments, it is not necessary to send the indicia information and/or account identifier information to the host computer system. The necessary information may be maintained at the retail establishment. Such information may be populated into the retail establishment's inventory system when the cards are received into inventory from the vendor. Otherwise, the process proceeds as if the information is being sent to a host computer system.

Once the purchase card is validated, it may thereafter be activated by having value loaded to it. The value may be loaded at the point of sale or loaded thereafter via a web site, Interactive Voice Response Unit (IVR), call center, or the like, for example. If loaded at the point of sale, the attendant asks the customer how much value to load to the card and the amount is added to the customer's ticket total. The information is also sent to the host computer system and stored in relationship with the account identifier. Thereafter, the value is accessible by the customer in any of a variety of ways, as described below.

To enable the customer to securely activate the card using a web site, IVR or the like, the purchase card may have a password associated therewith. The password may be printed on the carrier and hidden by a scratch-off region, for example. In some embodiments, the password is printed on a piece of paper sealed in an envelope, or otherwise inaccessible prior to purchase. If the customer or attendant notices the password has been revealed prior to purchase, then the purchase card may be destroyed and a different one purchased. In some embodiments, the password is returned from the host computer system and provided to the customer after the card is validated (e.g., printed on the customer's receipt).

If the card is later activated by the customer, the customer either calls an IVR or call center, visits the web site, or the like, to complete the activation process. The customer uses the account number in combination with the secret password to access an account relating to the purchase card. If value has yet to be loaded, the customer identifies the amount of value to load and identifies a source for the funds. If the value was loaded at the point of sale, the customer may simply complete the activation process at the IVR or web site. Even in embodiments in which initial value is loaded at the point of sale, the customer may thereafter load additional value by calling the IVR, visiting the web site, contacting a call center, and/or the like. The customer may also change the password, transfer value to another card or cardholder, and/or the like.

Those skilled in the art will appreciate many other examples in light of this disclosure. For example, in some embodiments, the account number (a.k.a. account identifier) may include letters or other symbols. The purchase card may be a "fob" or other radio frequency identification (RFID) device. In some embodiments, a biometric (finger print, retinal scan, etc.) of the customer may serve as the password.

In some embodiments, the card is "virtual" once activated, in which case a biometric of the customer, a memorized account number, or the like is used to initiate transactions using the virtual purchase card.

The first and second machine-readable indicium may be one-dimensional bar codes, two-dimensional bar codes, RFID emitters, characters readable via optical character recognition scanners, and/or the like. In some embodiments, the indicia are used only once so that multiple cards are not in circulation having the same indicium.

In some embodiments, the card purchased at the retail location is a temporary card. Once the card is validated and activated, a permanent card may be provided to the customer. This may be preceded with a personalization process wherein the cardholder provides personal information such as name, address, etc., at either the point of sale or via the call center, IVR, web site, etc.

Once activated, the customer may use the card as a typical credit card. In some embodiments, the card may be used at automated teller machines (ATM), in combination with the password, to access cash, transfer value, load additional value, and/or the like. In some embodiments, the customer may use the purchase card, in combination with the password, as a debit card to purchase goods or services. Many other transaction types are possible.

In some embodiments, the customer is only allowed to complete a purchase using the card if multiple criteria match the stored information. For example, upon presenting a gift card to pay for a purchase, the register attendant may swipe the account identifier from the magnetic stripe and scan the card's bar code. The information, along with the amount of the transaction, is sent to the host computer system where the account identifier and bar code are compared to the stored information. The value is compared to the remaining stored value to verify that sufficient value exists to fund the transaction. Only if all these checks pass is the transaction allowed to proceed. Those skilled in the art will appreciate many other variations and embodiments in light of this disclosure.

Figure 1B:
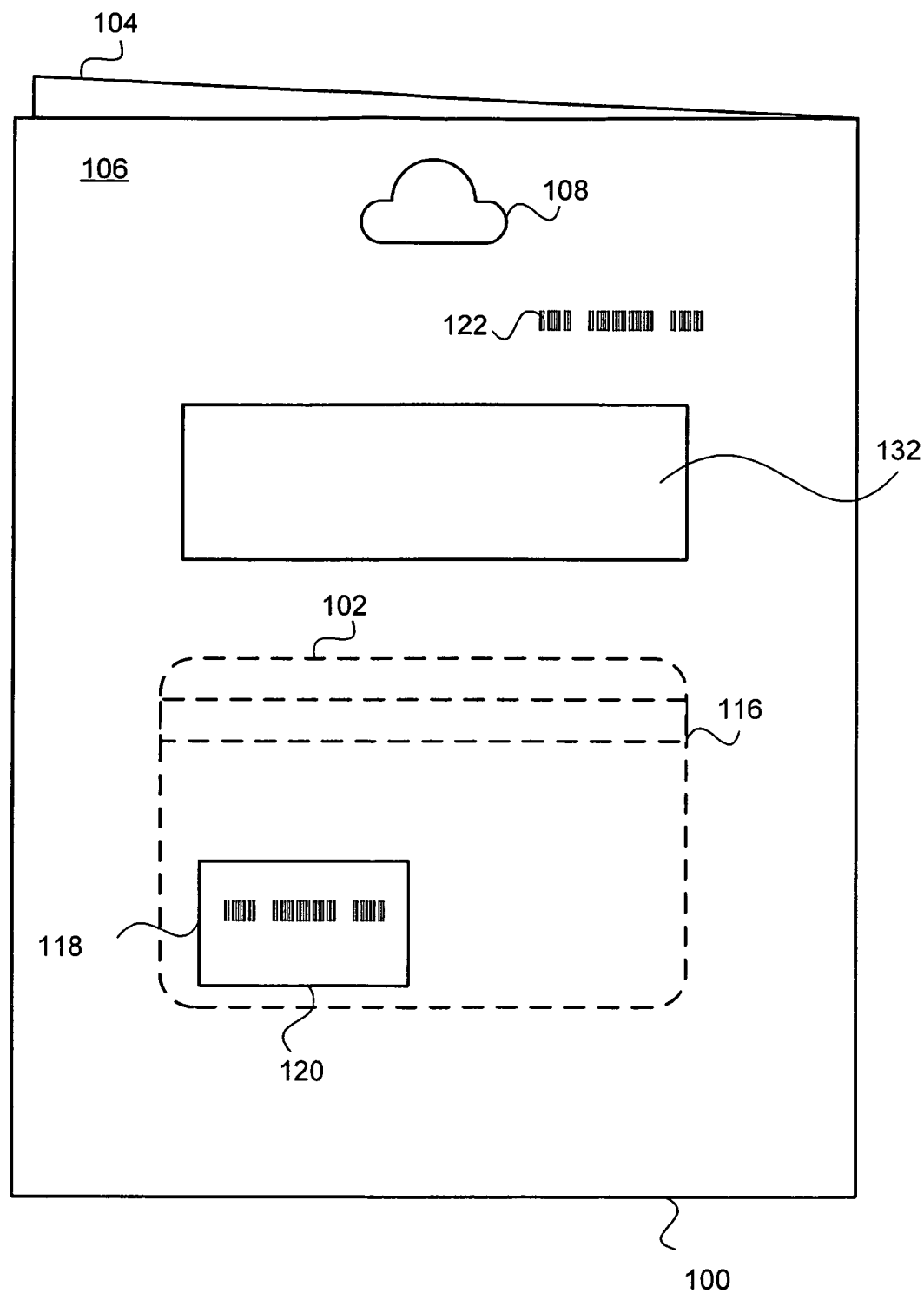
Figure 1C:
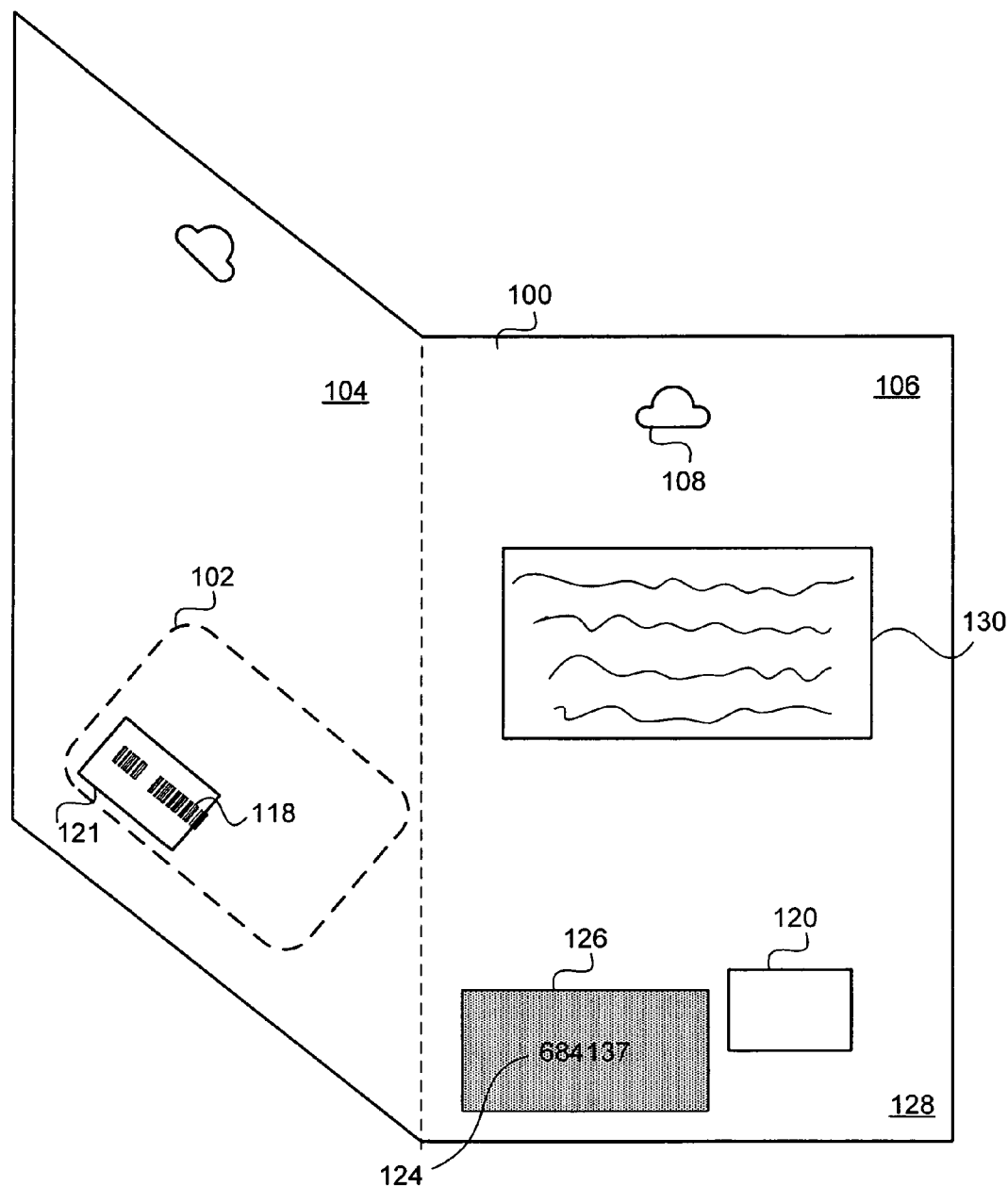

Having described embodiments of the invention generally, attention is directed to FIGS. 1A-C, which illustrate a specific example of a card carrier 100 and purchase card 102 according to embodiments of the invention. The card carrier 100 has front 104 and back 106 portions and may include a hole 108 for enabling convenient display. The card carrier also may include a product name or logo region 110 and an advertising region 112. Those skilled in the art will appreciate that the specific embodiment of FIGS. 1A-1C is merely exemplary of a number of possible embodiments according to the present invention.

The card 102 includes an embossed account identifier 114 and a magnetic stripe 116 into which a representation of the account number is encoded. The magnetic strip is typically on the back side of the card, as indicated by the broken outline of the magnetic stripe 116. The information encoded on the magnetic strip may be, for example, a hash of the embossed account number. In some embodiments, the card 102 is attached to the carrier such that the magnetic stripe 116 is accessible to a card reader. The card 102 may be enclosed in tamper-resistant packaging that allows the account number to still be viewable.

A machine-readable indicium 118 is printed on the back of the card 102. In this specific embodiment, the machine-readable indicia is a one-dimensional bar code, although other indicia include two-dimensional bar codes, characters capable of being read by an OCR scanner, RFID emissive tags, and/or the like. The machine-readable indicium 118 is viewable through apertures 120, 121 in the carrier 100, one in the back portion 104 and one in the front portion 106.

A machine-readable indicium 122 is printed on the back portion 106 of the carrier 100. Although the indicia 118, 122 need not be identical, the indicia are uniquely related to one another at a host computer system as will be described hereinafter.

A password 124 may be printed on the carrier 100. The password 124 may be hidden under a scratch-off region 126 on an interior portion 128 of the carrier. The password 124 also may be encoded on the magnetic stripe 116.

The carrier also may include a terms and conditions region 130, an instructions region 132, and/or the like.

Figure 2A:
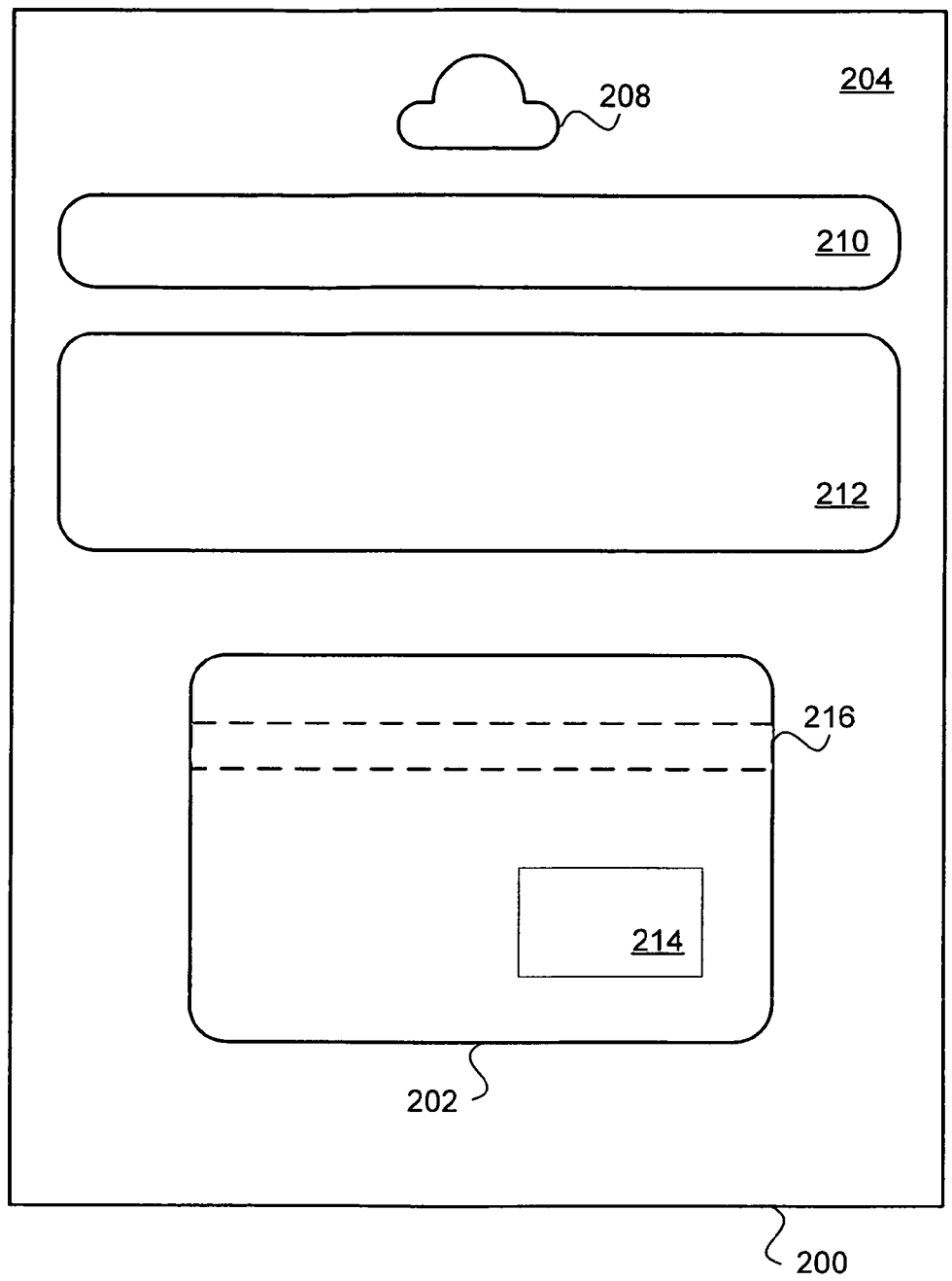
FIGS. 2A and 2B illustrate a second exemplary purchase card and carrier according to embodiments of the invention.
Figure 2B:
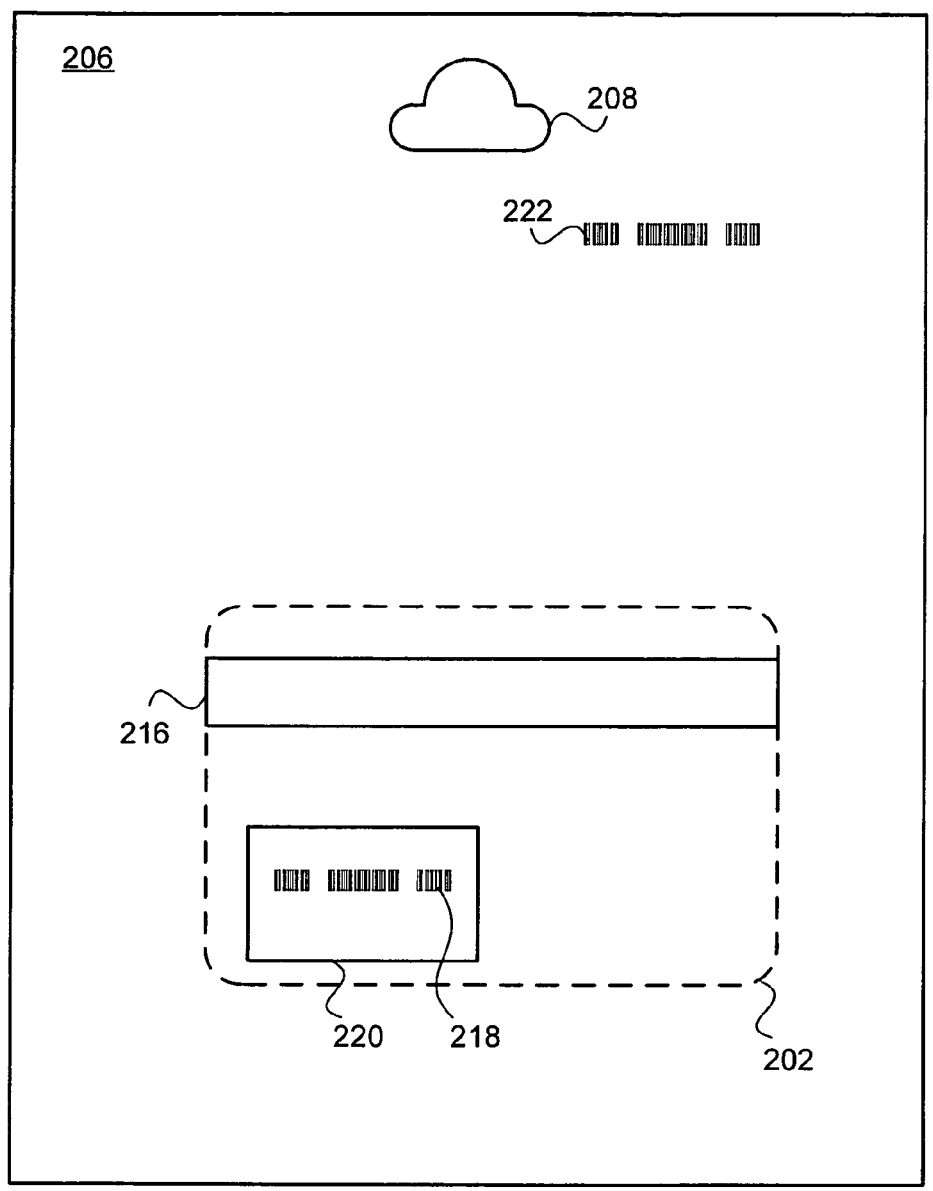

FIGS. 2A and 2B illustrate a second exemplary card carrier 200 and card 202 according to embodiments of the invention. In this embodiment, an account number is not embossed on the card. Further, in this embodiment the front 204 and back 206 portions of the carrier are merely opposite sides of the unfolded carrier. In this embodiment the magnetic stripe 216 of the card 202 is inaccessible to a card reader and may be packaged in tamper resistant packaging. Otherwise, the embodiments are substantially similar, with the last two digits of each respective reference numeral relating to analogous features.

Figure 3:
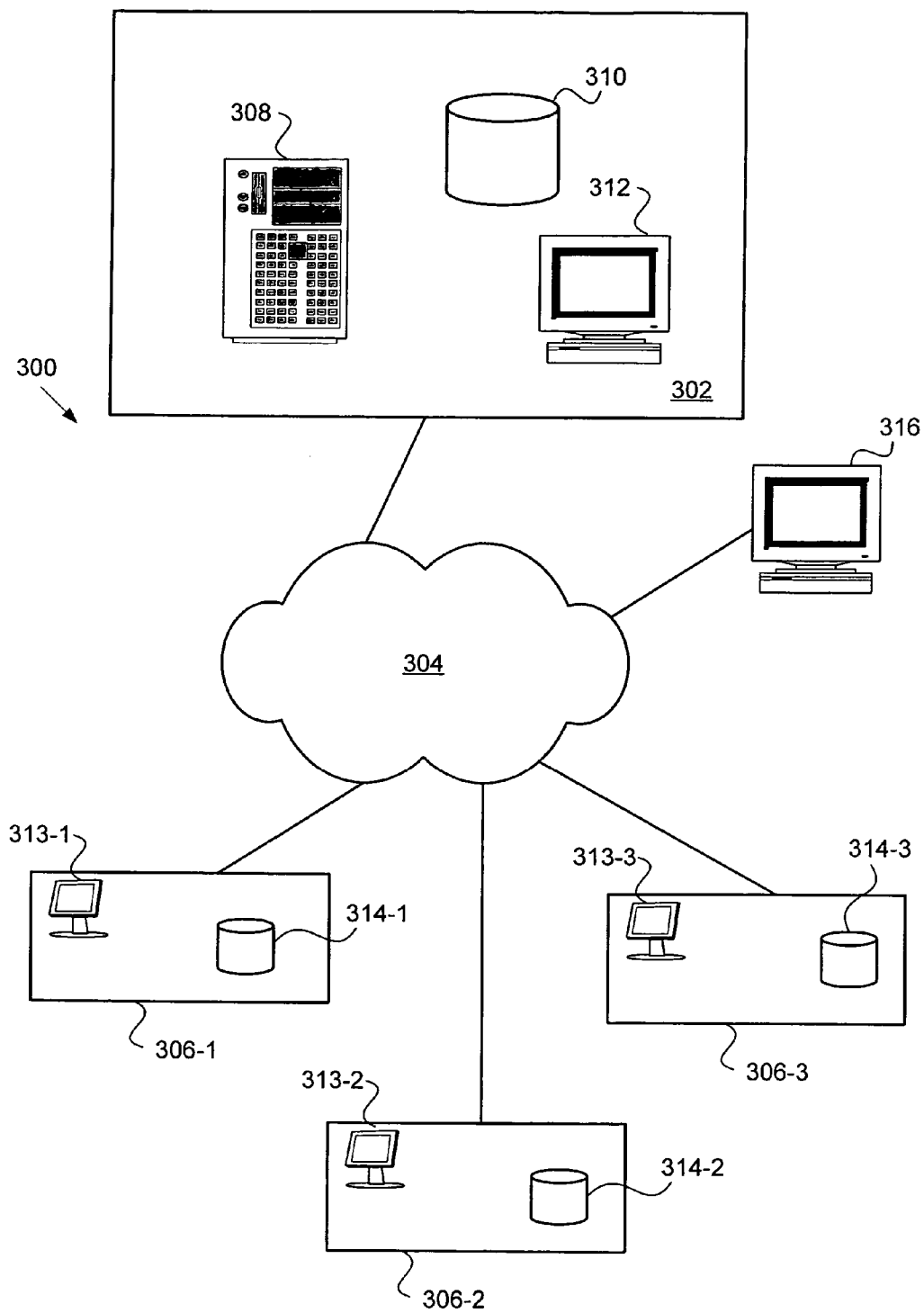
FIG. 3 illustrates an exemplary purchase card validation and activation system according to embodiments of the invention.

Attention is directed to FIG. 3, which illustrates a system 300 according to embodiments of the invention. Those skilled in the art will appreciate that the system 300 is merely exemplary of a number of possible embodiments according to the invention. The system 300 includes a host computer system 302 and a network 304 through which retail establishments 306 communicate with the host computer system 302. The host computer system 302 may include, for example, servers 308, database storage arrangements 310, workstation computers 312, and/or the like. The retail establishments 306 may include checkout scanners 313, local database storage arrangements 314, and/or the like. Users (i.e., purchase card customers) also may communicate with the host computer system 302 via the network 304 using personal computers 316, for example.

In operation, indicia from each card and card carrier are stored at the database storage arrangement 310. As stated previously, although the indicia need not be identical, the indicia from each card/card carrier pair is stored together or otherwise indicated as being uniquely related. In a specific embodiment, the database storage arrangement 310 includes a record having fields for each indicium, the account identifier associated with the card related to the indicia, the password related to the card (if used), and the load amount, which is typically blank or null until the card is activated and value is loaded.

When a card is presented for purchase at a retail establishment, a scanner 313 is used to scan the indicium from the card and the indicium from the carrier. In some embodiments, the attendant also enters the account number or scans it from the magnetic stripe. The attendant also may enter a load amount as instructed from the purchaser. The information is then sent to the host computer system 302 for validation. If the indicia are confirmed to be related to each other and to the account number, then the load amount is stored in the associated record in the data storage arrangement 310 and a validation message is retuned to the scanner. Thereafter, the purchaser completes the transaction by remitting funds in known ways. Hence, in this embodiment, the card is validated and activated in one process.

If the card is capable of being validated locally, the comparison may be done by the scanner or other local processor using the information from the local database storage arrangement 314. Periodically, the local database storage arrangement 314 may synchronize with the database storage arrangement 310 at the host computer system 302. In other embodiments, the value is actually stored on the card, thus eliminating the need to maintain an account balance at the host computer system. Other embodiments are possible.

In some embodiments, the purchaser does not load value at the point of sale. The purchaser may pay some nominal value for the card and thereafter complete the activation process by calling an IVR, logging on to a web site, or the like. For example, the purchaser may find a web site address (i.e., URL) in the instructions printed on the card carrier. Using his personal computer 316, the customer visits the web site, enters the account number and password from the card and carrier, and obtains access to the account associated with the card. The web site may be hosted, for example, at the server 308. Thereafter, the customer may personalize the account, load value, transfer value, change his password, and/or the like.

Figure 4:
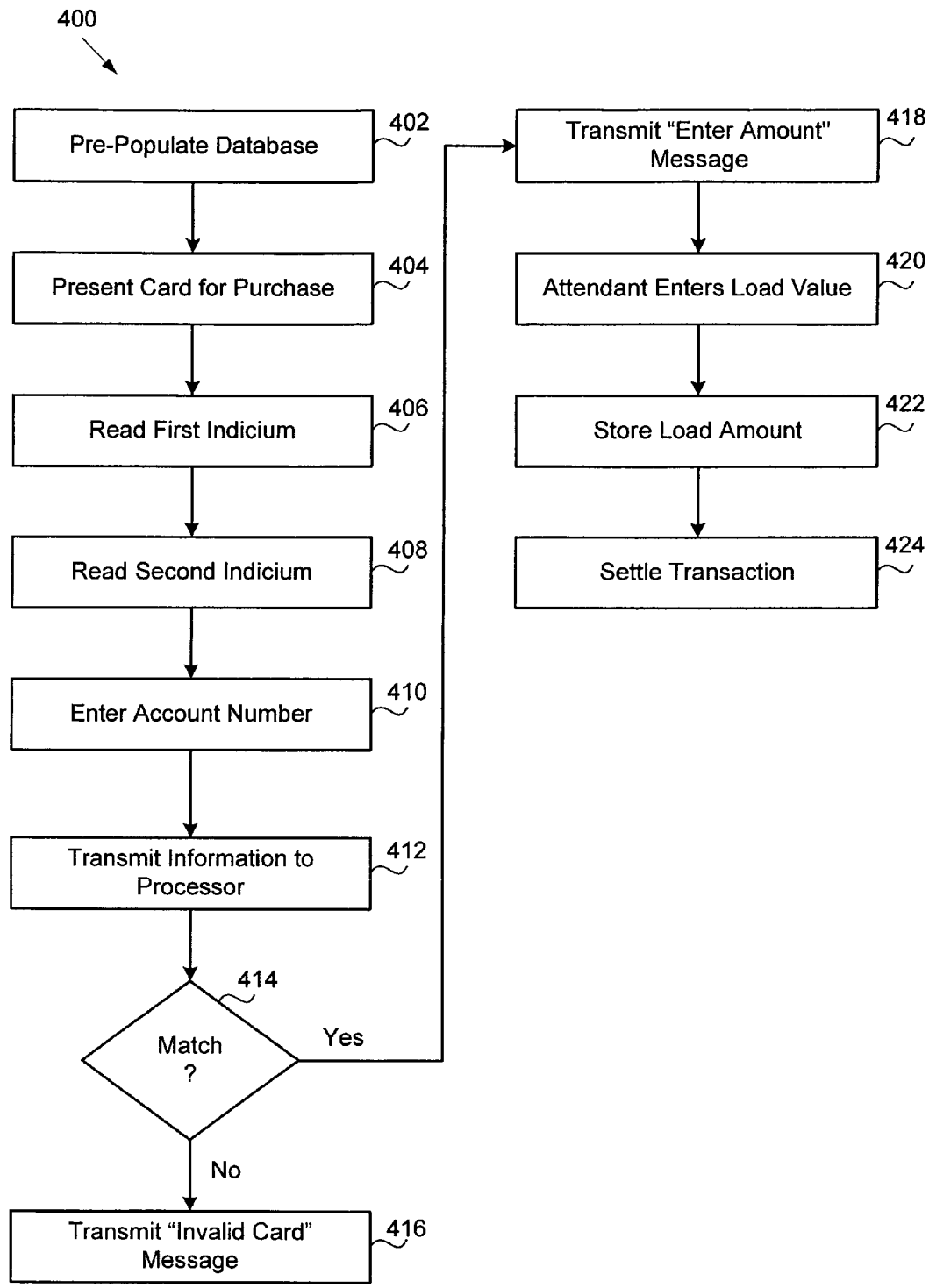
FIG. 4 illustrates a first method of validating and activating a purchase card according to embodiments of the invention, which method may be implemented in the system of FIG. 3.

Attention is directed to FIG. 4, which illustrates a method 400 of validating and activating a purchase card according to embodiments of the invention. The method may be embodied in the system of FIG. 3, or other appropriate system. Those skilled in the art will appreciate that the method 400 is merely exemplary and that other methods according to other embodiments may have more, fewer, or different steps than those illustrated and described herein. Further, other methods according to other embodiments may traverse the steps illustrated and described herein in different orders.

The method 400 begins at block 402, at which point a database is populated with information from one or more cards and card carriers. The information includes the indicium from the card, the indicium from the carrier, and the associated account identifier. In some embodiments, a password in also stored. Thereafter, the cards are made available for purchase.

At block 404, a purchaser presents a card for purchase at a retail establishment. A checkout attendant enables a checkout scanner for a transaction to validate the card. For example, the attendant may select a button on the scanner that tells the scanner that the subsequent transaction involves multiple steps and is not to be confused with a typical purchase item. In other embodiments, the scanner is enabled by the following step in which an indicium (e.g., bar code) is scanned. The scanner recognizes the item as a purchase card from the information read from the indicium and responds accordingly.

At step 406, the attendant scans or "swipes" information from a first bar code or other indicium. This may be, for example, the bar code 122 on the back of the card carrier 100. This is followed by a scan or swipe of the second bar code or other indicium at block 408. At block 410, the attendant keys in the account number from the front of the card. Thereafter, the information is sent to the host computer system (e.g., 302 from FIG. 3) at block 412.

In some embodiments, the checkout scanner controls the sequence of steps 406, 408, 410, and 412. For example, if the checkout attendant selects a key on the scanner that enables the scanner for this transaction, then a display screen of the scanner may instruct the attendant to first scan the carrier indicium. In response to the attendant scanning the carrier indicium, the scanner instructs the attendant to scan the card indicium. After the attendant does so, the scanner instructs the attendant to key in the account identifier. Once this is done, the scanner transmits the information to the host computer system.

In some embodiments, the scanner instructs the attendant to swipe the card through a reader to read the account identifier from the card. Swiping the account identifier from the card ensures that someone has not tampered with the magnetic stripe by encoding a different account number into the magnetic stripe. In other embodiments, such as those in which the card is enclosed in tamper-resistant packaging that nevertheless allows visual access to the account identifier, the attendant may simply key in the account identifier.

In some embodiments, the information is not sent to a host computer system at block 412. The information may be processed locally at a local processor and inventory database.

In some embodiments, the account number is not entered until after it is verified that the information from the two indicia match each other and/or the stored information. Many other examples are possible, such as the embodiment discussed with respect to FIG. 6 in which the account number is not verified as part of the verification process.

Continuing with the description of the method 400, at block 414 the host computer system verifies that the information from the two indicia match each other and/or the stored information. The host computer also determines whether the account identifier entered by the attendant, whether scanned or keyed, matches the stored account identifier. If the information does not match, the host computer system returns an "Invalid Card" message at block 416. Otherwise, the activation process continues at block 418, at which point the host computer system queries the point-of-sale device to enter the amount of value the customer whishes to load to the card.

If the card is to be activated at the point of sale, then at block 420 the attendant may enter into the point-of-sale device the amount of value the customer whishes to load to the card. The amount of value is sent to the host computer system and, at block 422, stored for later use in settling a transaction using the card. The method 500 to be described immediately hereinafter illustrates and describes activating the card after it has be validated at the point of sale.

Following either activation scenario, the customer may use the card in a transaction at block 424. The transaction may be a cash withdrawal at an ATM, a purchase transaction in which the card is used like a debit card, a purchase transaction in which the card is used as a credit card, a purchase transaction in which the card is used as a gift card by the initial purchaser or a giftee of the purchaser. Many such examples are possible.

Figure 5:
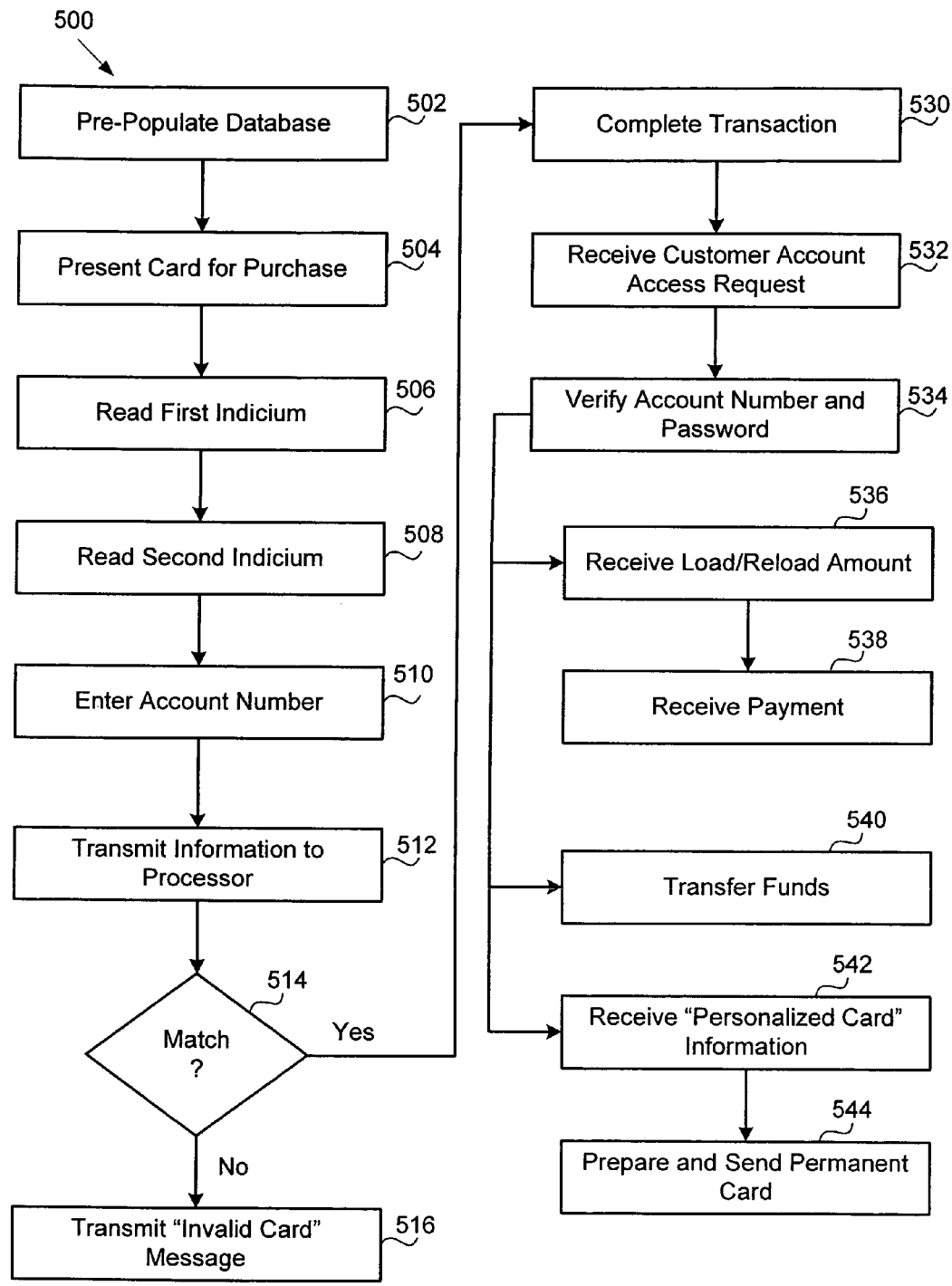
FIG. 5 illustrates a second method of validating and activating a purchase card according to embodiments of the invention, which method may be implemented in the system of FIG. 3.

FIG. 5 illustrates an exemplary method 500 of validating and activating a purchase card wherein activation takes place after the card is validated at the point of sale. In this method 500, many steps are identical to steps discussed with respect to FIG. 4. Analogous steps are indicated with reference to the last two digits of the reference numeral. The differences between the embodiments of FIGS. 4 and 5 begins at block 530 at which point the transaction to purchase the card ends without loading value to the card. The customer completes the transaction by paying for the card and any other items purchased. Those skilled in the art will appreciate that the card may cost some nominal value or nothing in some embodiments.

Thereafter, the card purchaser initiates activation by contacting an IVR, call center, web site, or the like at block 532. In doing so, the customer provides an account identifier and password, which are verified at block 534.

If the account identifier and password match the stored account identifier and associated password, then the customer my load or reload value to the card at block 536. The customer enters the amount of value to load and remits payment at block 538. The value is added to any preexisting value for later use in settling a transaction.

In some embodiments, the customer may transfer funds to another card or card holder at block 540. This would be accomplished by entering the account identifier of the receiving account and the amount of value to transfer. The may be useful, for example, in paying bills on line, etc.

The customer also may personalize the card by entering personal information (e.g., name, address, etc.) at block 542. This is especially useful with cards such as prepaid debit cards, credit cards, and the like, which typically require personalization prior to acceptance for may transactions. Once the customer personalizes the card, a permanent, personalized card may be prepared and sent at block 542. It may be the case that any indicium associated with the temporary card (e.g., bar codes) are disabled from further use to prevent account duplication.

Figure 6:
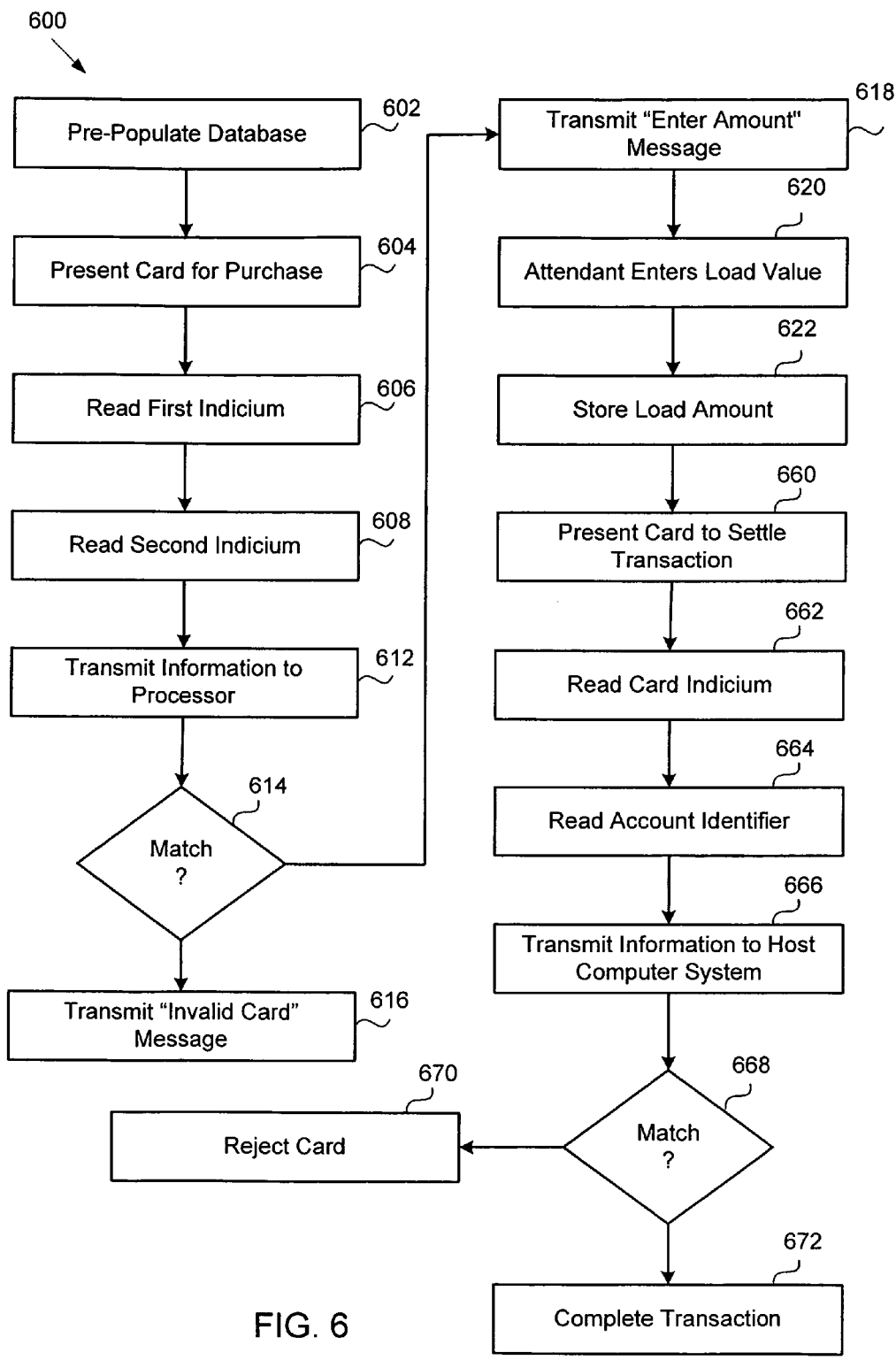
FIG. 6 illustrates a third method of validating and activating a purchase card according to embodiments of the invention, which method may be implemented in the system of FIG. 3. The method of FIG. 6 is particularly applicable to the card/card carrier embodiment of FIGS. 2A and 2B.

FIG. 6 illustrates another exemplary validation and activation method 600 according to embodiments of the invention. This embodiment generally relates to the card/card carrier embodiment of FIG. 1 in which the account number is not embossed on the card. Again, in this exemplary embodiment, the last two digits of each reference numeral identify analogous steps from the previous method embodiments.

In this embodiment, the account number is not verified at the point-of-sale. Hence, step x10 is not performed. Otherwise, the embodiment proceeds as the embodiment of FIG. 4 un to block 422. Settling a transaction using a card according to this embodiment include a few additional steps, as will be described.

At block 660, the cardholder presents the card to settle a transaction. Settling a transaction using a card of this embodiment includes reading the card indicium at block 662 and reading the account identifier at block 664. These steps include, for example, scanning the bar code and swiping the card. At block 666, the information is sent to the host computer system. The information includes the transaction amount, in addition to the information read from the card indicium and the account identifier. A comparison is made at block 668, and if the information does not match or there is insufficient stored value to settle the transaction, then the card is rejected at block 670. Otherwise, the transaction is settled against the stored value at block 672.

Figure 7:
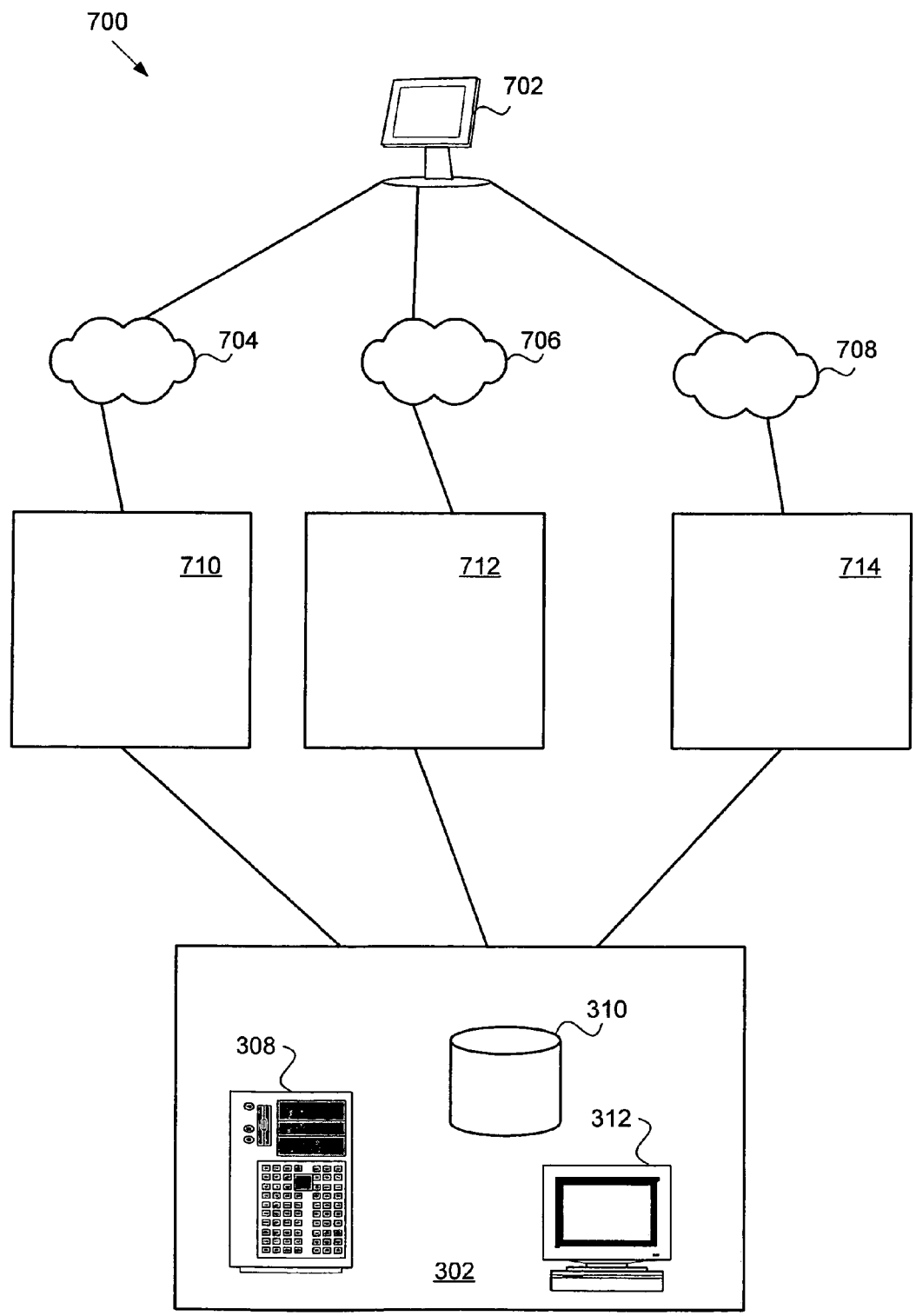
FIG. 7 illustrates a settlement system according to embodiments of the invention.

The method 600 described but one settlement method according to embodiments of the invention. Many exist and may be implemented in the system 700 of FIG. 7 or other appropriate system. The system 700 includes a point-of-sale (POS) device 702 and several settlement networks 704, 706, 708. The settlement networks may be, for example, a private network 704, through which gift cards and the like are settled; a branded debit network 706, (e.g., the STAR™ network) through which debit or Automated Teller Machine (ATM) transactions are settled; and a credit card network 708 (e.g., a MASTERCARD™ network), through which credit card transactions are settled. The POS device 702 may be a checkout scanner, an ATM, a web site settlement engine, or the like. The POS device is configured to recognize the type of transaction in which the card is being used and/or configured to be responsive to a customer's selection of the type of transaction desired. As a result, the POS device 702 directs the transition settlement information to the appropriate network. As is known, this may include dialing a specific number, accessing a particular IP address, or the like.

Each settlement channel may include an intermediary 710, 712, 714 that appropriately directs the transaction so that necessary authorization and/or settlement details eventually reach the host computer system 302, described previously with respect to FIG. 3. Intermediaries may include, for example, a transaction processor that processes the transactions of the merchant at which the POS is located, an acquiring bank, an issuing institution, and the like. As is apparent to those skilled in the art, the networks merge, according to some embodiments, with a single processor handling all intervening activities between the POS device 702 and the host computer system 302.

Figure 8:
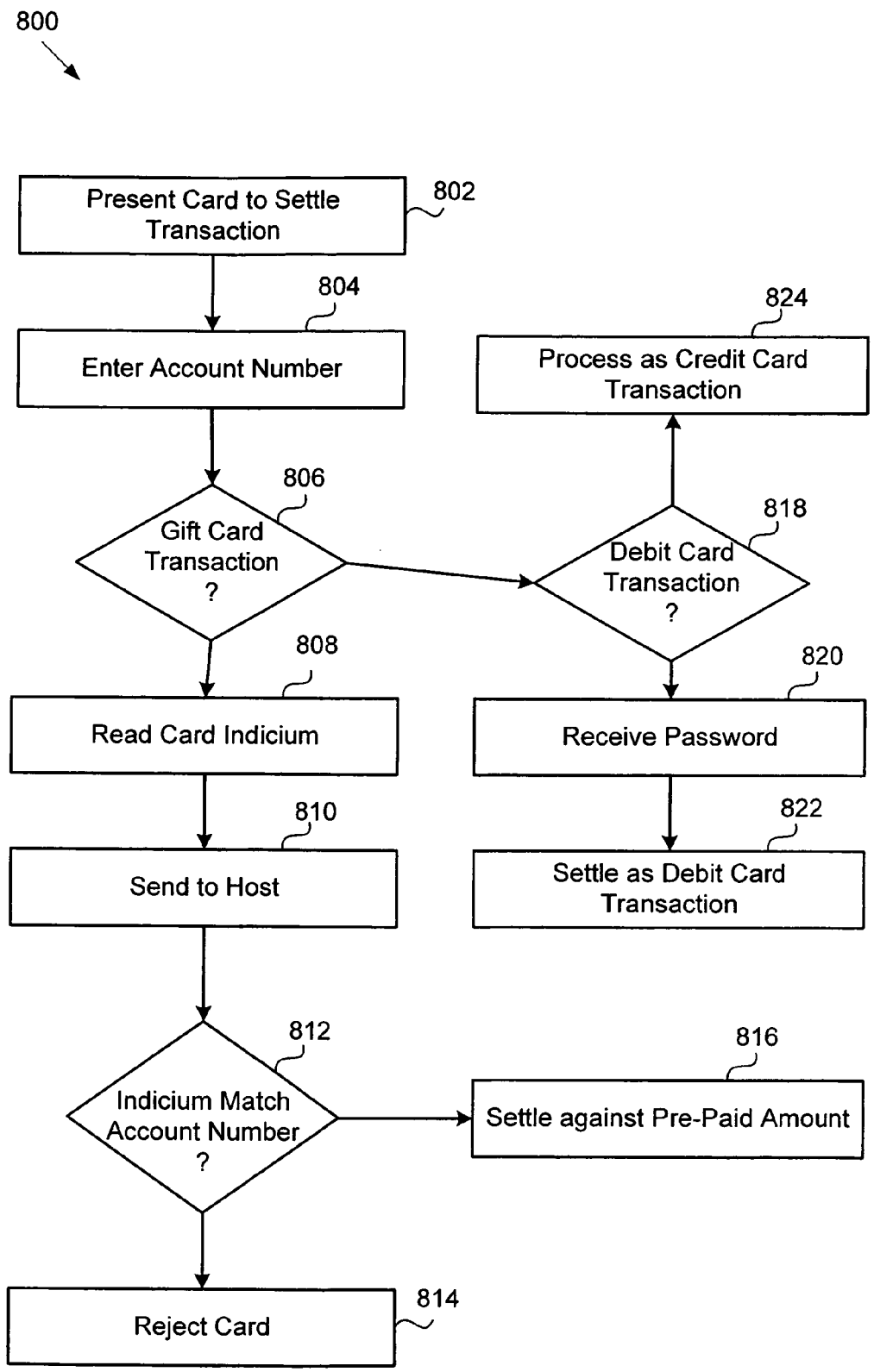
FIG. 8 illustrates a settlement method according to embodiments of the invention, which method may be implemented in the system of FIG. 7.

FIG. 8 illustrates a settlement method 800 according to embodiments of the invention. The method begins at block 802 when a cardholder presents a card to settle a transaction. At block 804, the account number is entered into a POS device, such as a checkout scanner. At block 806, a determination is made whether the transaction relates to a gift card or other type of stored value card. This determination may be made with reference to the account number, a selection by the cardholder, the attendant, or the like. If the transaction is to be settled using a gift card, then the card indicium (e.g., bar code) is read at block 808. The information is sent to the host computer system at block 810 and a determination is made at block 812 whether the information matches the stored information and whether sufficient funds exist to settle the transaction. If any check fails, the card is reject at block 814 and an appropriate message is returned to the POS. Otherwise, the transaction is settled against the prepaid amount at block 816.

Returning to the determination made at block 806, if the transaction is not being settled against a gift card, then a determination is made whether the transaction is being settled against a debit card at block 818. As with the prior determination, this may be done with reference to the account number, a cardholder input, an attendant input, or the like. If the card is being used as a debit card, then the customer enters a password at block 820. Provided the password and account number match the stored information and there exists sufficient value to settle the transaction, then the transaction is settled at block 822.

If the card is not being used as a debit card or gift card, then it may be used as a credit card. If so, the transaction is settled as a credit card transaction at block 824. This may include accomplishing an authorization, in which the value loaded against the card is treated as a credit limit and the transaction authorized only if a sufficient balance exists. Thereafter, the transaction may be batch settled in known ways. Those skilled in the art will appreciate may other settlement embodiments in light of the disclosure herein.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention, which is defined in the following claims.

What is claimed is:

1. A method of validating and activating a purchase card, comprising:
    providing a purchase card that is removably attached to a card carrier, wherein the purchase card has an account identifier associated therewith, wherein the purchase card includes a machine-readable information encoding region into which the account identifier is encoded, and wherein the purchase card has a hidden password associated therewith;
    populating a database with a stored password that relates to the hidden password, and a stored account identifier that relates to the account identifier, thereby uniquely coupling the account identifier to the hidden password;
    at a point-of sale device and in response to a customer request to purchase the purchase card, entering the account identifier into the point-of-sale device;
    comparing the account identifier to the stored account identifier;
    based at least in part on the comparing step, associating value to the card;
    thereafter, receiving a request at an activation location initiated by the customer to activate the card;
    activating the card;
    thereafter, receiving a request at a host computer system to settle a transaction using the card, wherein the request includes the account identifier, the hidden password, and a transaction settlement amount; and
    based at least in part on the account identifier and the hidden password, settling the transaction.

2. The method of claim 1, wherein the card carrier further has terms and conditions affixed thereto.

3. The method of claim 1, wherein entering the account identifier into the point-of-sale device comprises reading the account identifier from the machine-readable information encoding region.

4. The method of claim 1, wherein the account identifier is embossed on the card and wherein entering the account identifier into the point-of-sale device comprises an attendant keying the account identifier into the point-of-sale device.

5. The method of claim 1, wherein settling the transaction comprises:
    at the host computer system, comparing the account identifier to the stored account identifier, the hidden password to the stored password, and the transaction settlement amount to an amount of value associated with the card; and
    based at least in part on the comparing step, debiting the transaction settlement amount from the amount of value associated with the card.

6. The method of claim 5, wherein settling a transaction comprises a selection from a group consisting of:
    receiving cash at an automated teller machine;
    settling a purchase transaction as a debit card transaction;
    settling a purchase transaction as a credit card transaction; and
    settling a purchase transaction as a gift card transaction.

7. The method of claim 1, wherein the card carrier has a carrier indicium affixed thereto, and wherein the carrier indicium comprises a selection from a group consisting of:
    a bar code; and
    a radio frequency identification tag.

8. The method of claim 1, wherein the purchase card comprises a selection from a group consisting of gift card, pre-paid debit card, stored value card, and credit card.

9. The method of claim 1, wherein the point-of-sale device comprises a checkout scanner.

10. The method of claim 1, wherein the machine-readable information encoding region comprises a selection from a group consisting of magnetic stripe and radio frequency identification tag.

11. The method of claim 1, wherein comparing the account identifier to the stored account identifier comprises:
    sending the account identifier to a processor associated with the database;
    extracting the stored account identifier from the database; and
    comparing the account identifier to the stored account identifier.

12. The method of claim 1, wherein the database comprises a database associated with a host computer system.

13. The method of claim 1, wherein the carrier has activation instructions affixed thereto.

14. The method of claim 1, wherein the activation location comprises a selection from a group consisting of:
    web site;
    interactive voice response unit; and
    call center.

15. The method of claim 1, further comprising:
    receiving a customer-initiated request to receive a personalized card relating to the purchase card, wherein receiving the customer-initiated request to receive the personalized card comprises receiving a name and address of the customer at an activation location; and
    preparing the personalized card and sending it to the customer.

16. The method of claim 15, further comprising:
    receiving a request to settle a transaction using the personalized card; and
    settling the transaction.

17. A method of validating and activating a purchase card, comprising:
    providing a purchase card that is removably attached to a card carrier, wherein the purchase card has an account identifier associated therewith, wherein the purchase card includes a machine-readable information encoding region into which the account identifier is encoded, and wherein the purchase card has a hidden password associated therewith;
    populating a database with a stored password that relates to the hidden password and a stored account identifier that relates to the account identifier, thereby uniquely coupling the account identifier to the hidden password;

at a point-of-sale device and in response to a customer request to purchase the purchase card, entering the account identifier into the point-of-sale device;

comparing the account identifier to the stored account identifier;

based at least in part on the comparing step, associating value to the card;

thereafter, receiving a request at an activation location initiated by the customer to activate the card;

based at least in part on account identifier, activating the card;

receiving a customer-initiated request to receive a personalized card relating to the purchase card, wherein receiving the customer-initiated request to receive the personalized card comprises receiving a name and address of the customer at an activation location;

preparing the personalized card and sending it to the customer;

receiving a request to settle a transaction using the personalized card; and settling the transaction.

18. The method of claim 17, wherein settling the transaction comprises settling the transaction without receiving the hidden password.

19. The method of claim 17, wherein the request to settle a transaction using the personalized card includes the account identifier, the hidden password, and a transaction settlement amount, the method further comprising based at least in part on the account identifier and the hidden password, settling the transaction.

20. A method of validating and activating a purchase card, comprising:

providing a purchase card that is removably attached to a card carrier, wherein the purchase card has an account identifier associated therewith and has a card indicium affixed thereto, wherein the purchase card includes a machine-readable information encoding region into which the account identifier is encoded, and wherein the card carrier has a carrier indicium affixed thereto;

populating a database with a stored account identifier that relates to the account identifier and one of a stored card indicium that relates to the card indicium and a stored carrier indicium that relates to the carrier indicium, thereby uniquely coupling the account identifier to either the carrier indicium or the card indicium;

at a point-of-sale device and in response to a customer request to purchase the purchase card, entering information from the account identifier into the point-of-sale device;

at the point-of-sale device, entering information from either the carrier indicium or the card indicium into the point-of-sale device;

comparing the entered information to the stored information; and based at least in part on the comparing step, associating value to the card;

thereafter, receiving a request at an activation location initiated by the customer to activate the card, wherein the activation location comprises a selection from a group consisting of web site, interactive voice response unit, and call center.

* * * * *